ably toward both sides and which is in communication in the radial direction by at least one bore each with the sealing surfaces for the externally toothed gear and to the internally toothed gear.

United States Patent

[11] 3,586,465

| [72] | Inventor | Georg Eltze<br>Stuttgart, Riedenberg, Germany |
| [21] | Appl. No. | 888,559 |
| [22] | Filed | Dec. 29, 1969 |
| [45] | Patented | June 22, 1971 |
| [73] | Assignee | Daimler-Benz Aktiengesellschaft<br>Stuttgart-Unterturkheim, Germany |
| [32] | Priority | Dec. 27, 1968 |
| [33] | | Germany |
| [31] | | P 18 17 165.8 |

[54] INTERNALLY TOOTHED GEAR PUMP
24 Claims, 3 Drawing Figs.

[52] U.S. Cl. .................................................. 418/126,
                                                            418/170
[51] Int. Cl. .................................................. F01c 1/10
[50] Field of Search .......................................... 418/78,
                                              169, 170, 171, 126

[56] References Cited
UNITED STATES PATENTS

| 1,646,615 | 10/1927 | Furness | 418/170 X |
| 1,802,527 | 4/1931 | Nichols | 418/169 |
| 2,544,144 | 3/1951 | Ellis | 418/78 X |
| 2,774,309 | 12/1956 | Stoyke et al. | 418/170 |
| 2,875,700 | 3/1959 | Hardy | 418/170 X |
| 3,270,679 | 9/1966 | Sand et al. | 418/126 |
| 3,315,608 | 4/1967 | Eckerle | 418/169 X |
| 3,486,459 | 12/1969 | Eltze | 418/126 |

*Primary Examiner*—Carlton R. Croyle
*Assistant Examiner*—Wilbur J. Goodlin
*Attorney*—Craig, Antonelli, Stewart and Hill ABSTRACT: A gear pump, especially for the pressure medium supply of automatic transmissions of motor vehicles, in which an approximately sickle-shaped segment is arranged between the externally toothed gear and the internally toothed gear; the segment includes a hollow space which is open axially toward both sides and which is in communication in the radial direction by at least one bore each with the sealing surfaces for the externally toothed gear and to the internally toothed gear.

PATENTED JUN 22 1971 3,586,465

INVENTOR
GEORG ELTZE

BY Craig, Antonelli, Stewart & Hill

ATTORNEYS

INTERNALLY TOOTHED GEAR PUMP

The present invention relates to an internally toothed gear pump, especially for the pressure medium supply of automatically shifting motor vehicle change speed transmissions, in which an approximately sickle-shaped segment is arranged between the externally toothed and the internally toothed gear.

Pumps of the type described above have been utilized for some time for the pressure medium supply in automatic motor vehicle change speed transmissions and, in connection therewith, especially as so-called primary pumps which are driven directly from a hydraulic transmission part, for example, from a torque converter connected to the input of the mechanical transmission part. These pumps cause frequently difficulties as regards their accurate sealing at the segment with respect to the two toothed arrangements. Additionally, the question of noise development plays a role in connection therewith because these pumps are driven with relatively high rotational speeds. This is due to the fact that frequently disagreeable noises are developed by the pressure shocks pulsating at high frequency. The type and quality of the seal thus is effective not only directly on the pressure characteristics but indirectly also on the noise development of the pumps and in particular the last-mentioned point may be particularly annoying in passenger motor vehicles of high comfort.

The present invention is now based on the task to improve for the reasons mentioned above, the seal in such pumps. The underlying problems are solved in accordance with the present invention with the pumps of the aforementioned type in that the segment includes a hollow space which is axially open toward both sides and is in communication radially by at least one bore each with the sealing surfaces to the externally toothed and to the internally toothed gear wheel. In this manner, the interior space of the segment is acted upon by way of the bores of the pressure of the pump. As a result of this loading, there takes place a spreading or expansion of the segment which is controlled automatically by the pressure. The seal thus acts self-adjusting, so to speak of.

As regards the location of the bores themselves, one has to consider that with increasing rotational speed, the change point of suction side to pressure side moves ever more from the suction side toward the pressure side. Consequently, the present invention prefers a construction according to which the bore to the externally toothed gear is displaced in the circumferential direction with respect to the bore to the internally toothed gear. A pressure equalization of the differently long sealing surfaces may be realized by such a displacement or offset.

In particular, the present invention proposes in connection therewith that at least one of the bores is displaced toward the suction side with respect to the center of the segment plane containing the pump axis. A type of construction is particularly appropriate, in which the bore to the internally toothed gear is offset or displaced more strongly toward the suction side than the bore to the externally toothed gear.

The aimed-at effect can be further improved by a self-adjustment of the entire segment. Consequently, a further feature and development of the present invention resides in that the segment is arranged between the two gears freely movable at least in one direction. This can take place in one type of construction in such a manner that this segment is pivotally supported at or in proximity of one of its ends on a pin or the like disposed parallel to the gear wheel axes. A further development even provides that the segment is supported with its end face disposed on the suction side at a pin or the like disposed parallel to the gear axes. In this manner, the segment receives complete freedom and can adjust itself between the gears.

In order that during the starting of the pump—i.e., when no pressure is present—a tearing along of the segment by the gears is prevented, the present invention further proposes that the segment is limited in its freedom of movement in the direction toward the pressure side with small play by an abutment. Appropriately, this abutment is thereby disposed inside the hollow space provided in accordance with the present invention.

For the case that the segment consists of a material with a high elasticity modulus, such as, for example, cast iron, the present invention proposes that a slot is machined into the segment from the end face on the pressure side and that this slot is again closed at its pressure-side end by the insertion of a rubber plug. In the event that the segment consists of a material with a low elasticity modulus, the hollow space is arranged according to the present invention approximately symmetrically in the segment and is closed on both sides thereof in the same manner as regards material. This means, in this case, the hollow space may be made, for example, by molding or casting integrally.

Accordingly, it is an object of the present invention to provide a gear pump of the type described above which eliminates by simple means the aforementioned shortcomings and drawbacks encountered heretofore in the prior art.

Another object of the present invention resides in a gear pump, especially for the pressure medium supply of automatically shifting transmissions which not only improves the sealing but also reduces the danger of annoyable noise developments.

A still further object of the present invention resides in a gear pump of the type described above in which the seal is self-adjusting, so to speak of.

These and other objects, features, and advantages of the present invention will become more obvious from the following description when taken in connection with the accompanying drawing which shows, for purposes of illustration only, several embodiments in accordance with the present invention, and wherein.

Figure 1:
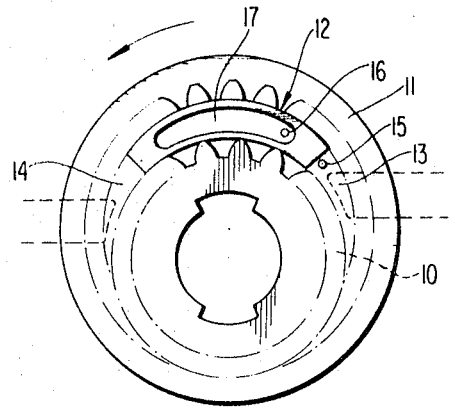
FIG. 1 is a schematic side view of an internally toothed pump in accordance with the present invention.

Referring now to the drawing wherein like reference numerals are used throughout the various views to designate like parts, and more particularly to FIG. 1, the externally toothed pump gear 10 engages in this Figure in a conventional manner with the internally toothed pump gear 11. Both gears 10 and 11 are arranged in a housing indicated only schematically since of conventional construction, and are sealed with respect thereto. A segment generally designated by reference numeral 12 is disposed between the two gears 10 and 11 which abuts sealingly against the housing end faces and against the teeth. Both gears 10 and 11 rotate counterclockwise and the segment 12 separates the suction side 13 from the pressure side 14.

The segment 12 is supported at the end face on the suction side 13, on a pin 15 which is fastened in the housing and extends parallel to the pump axis. A further pin 16 which is also fastened in the housing parallel to the pump axis, engages in a hollow space 17 of the segment 12. The arrangement is thereby made in such a manner that the segment 12 only has a very slight play in the circumferential direction.

Figure 2:
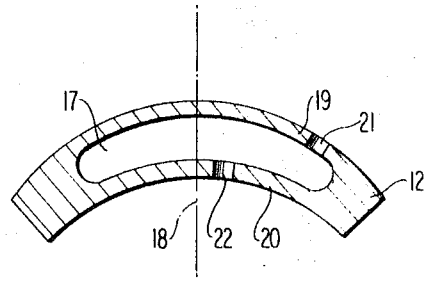
FIG. 2 is a cross-sectional view through the segment of the pump according to FIG. 1, on an enlarged scale.

According to FIG. 2, the hollow space 17 is arranged in the segment 12 approximately symmetrically to the plane 18. Both the external wall 19 as also the internal wall 20 of the segment 12 are provided with a bore 21 and 22 each extending through these walls. Both bores 21 and 22 are disposed offset with respect to the plane 18 in the direction toward the suction side whereby, however, the bore 21 facing the internally toothed gear has a more pronounced offset. The pressure medium now enters from the sealing surfaces through the hollow space 17. As a result thereof, the segment 12 is more or less spread or expanding corresponding to the pressure conditions. The sealing surfaces are therefore applied against the gears 10 and 11 with a force dependent on the pressure.

Figure 3:
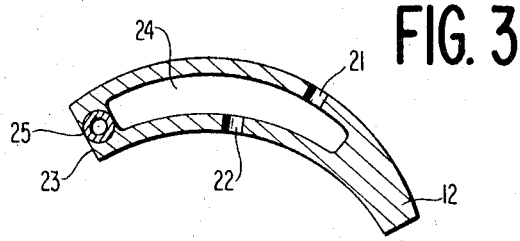
FIG. 3 is a cross-sectional view through a modified embodiment of a segment, also on an enlarged scale.

According to FIG. 3, a slot 24 is machined into the segment 12 from the end face 23 on the pressure side thereof or, for example, a correspondingly cast-in hollow space 24 is opened by a short slot in the direction toward the end face 23 on the pressure side. A cylindrical or hollow-cylindrical rubber plug 25 is now inserted into the slot so that again a hollow space closed in itself results therefrom.

This type of construction is suited in particular when the segment 12 consists of a material of high elasticity modulus. Also in this segment, bores 21 and 22 are again provided which may be arranged, in principle, in the same manner as illustrated in FIG. 2. Also, the operation thereof is the same.

While I have shown and described only two embodiments in accordance with the present invention, it is understood that the present invention is not limited thereby but is susceptible of numerous changes and modifications as known to those skilled in the art, and I therefore do not wish to be limited to the details shown and described herein but intend to cover all such changes and modifications as are within the scope of those skilled in the art.

I claim:

1. An internally toothed gear pump, in which an approximately sickle-shaped segment means is arranged between an externally toothed and an internally toothed gear, characterized in that the segment means is provided with a hollow space which is substantially open axially in the direction of the two sides and which is in communication radially by way of at least one bore each with the sealing surfaces for the externally and internally toothed gear.

2. A gear pump according to claim 1, characterized in that the pump serves as pressure medium supply of an automatic motor vehicle change speed transmission.

3. A gear pump according to claim 1, characterized in that the bore to the externally toothed gear is offset in the circumferential direction with respect to the bore to the internally toothed gear.

4. A gear pump according to claim 3, characterized in that at least one of the bores is offset toward the suction side with respect to the center plane of the segment means containing the pump axis.

5. A gear pump according to claim 4, characterized in that the bore to the internally toothed gear is offset more strongly toward the suction side than the bore to the externally toothed gear.

6. A gear pump according to claim 5, characterized in that the segment means is arranged freely movable at least in one direction between the two gears.

7. A gear pump according to claim 6, characterized in that the segment means is pivotally supported in proximity of one of its ends.

8. A gear pump according to claim 7, characterized in that the segment means is pivotally supported at said one end on a pin extending substantially parallel to the gear axes.

9. A gear pump according to claim 6, wherein said segment means is pivotally supported at said one end.

10. A gear pump according to claim 6, characterized in that the segment means is supported with its end face on the suction side on a pin means extending substantially parallel to the gear axes.

11. A gear pump according to claim 6, characterized in that the segment means is limited in its freedom of movement in the direction toward the pressure side with a small play by an abutment means.

12. A gear pump according to claim 6, with a segment means made of a material with a high elasticity modulus, characterized in that a slot is machined into the segment means from the end surface on the pressure side and in that this slot is again closed at its end on the pressure side by the insertion of an elastic plug.

13. A gear pump according to claim 12, characterized in that the segment means is made from cast iron.

14. A gear pump according to claim 6, with a segment means made from a material with low elasticity modulus, characterized in that the hollow space in the segment means is arranged approximately symmetrically within the segment means and is closed on both sides thereof in the same manner as regards material.

15. A gear pump according to claim 1, characterized in that at least one of the bores is offset toward the suction side with respect to the center plane of the segment means containing the pump axis.

16. A gear pump according to claim 15, characterized in that the bore to the internally toothed gear is offset more strongly toward the suction side than the bore to the externally toothed gear.

17. A gear pump according to claim 1, characterized in that the segment means is arranged freely movable at least in one direction between the two gears.

18. A gear pump according to claim 17, characterized in that the segment means is pivotally supported in proximity of one of its ends.

19. A gear pump according to claim 17, wherein said segment means is pivotally supported at said one end.

20. A gear pump according to claim 19, characterized in that the segment means is pivotally supported at said one end on a pin extending substantially parallel to the gear axes.

21. A gear pump according to claim 1, characterized in that the segment means is supported with its end face on the suction side on a pin means extending substantially parallel to the gear axes.

22. A gear pump according to claim 21, characterized in that the segment means is limited in its freedom of movement in the direction toward the pressure side with a small play by an abutment means.

23. A gear pump according to claim 1, with a segment means made of a material with a high elasticity modulus, characterized in that a slot is machined into the segment means from the end surface on the pressure side and in that this slot is again closed at its end on the pressure side by the insertion of an elastic plug.

24. A gear pump according to claim 1, with a segment means made from a material with low elasticity modulus, characterized in that the hollow space in the segment means is arranged approximately symmetrically within the segment means and is closed on both sides thereof in the same manner as regards material.